March 21, 1972 G. G. MENKEL 3,651,185
METHOD FOR THERMOFORMING A SCREW CAP CLOSURE
Filed Dec. 17, 1969 4 Sheets-Sheet 1

FIG. I

INVENTOR
GARY G. MENKEL
BY
Curtis, Morris & Safford
ATTORNEYS

March 21, 1972  G. G. MENKEL  3,651,185
METHOD FOR THERMOFORMING A SCREW CAP CLOSURE
Filed Dec. 17, 1969  4 Sheets-Sheet 4

INVENTOR
GARY G. MENKEL
BY
Curtis, Morris & Safford
ATTORNEYS

United States Patent Office 3,651,185
Patented Mar. 21, 1972

3,651,185
METHOD FOR THERMOFORMING A SCREW CAP CLOSURE
Gary G. Menkel, Holliswood, N.Y., assignor to Design Center, Inc., Long Island City, N.Y.
Filed Dec. 17, 1969, Ser. No. 885,848
Int. Cl. B29c 17/04
U.S. Cl. 264—89
6 Claims

ABSTRACT OF THE DISCLOSURE

A method for thermoforming a screw cap closure wherein a flat sheet or web of thermoplastic material is initially heated and placed over a female mold cavity and a mating male mold is pressed against the heated plastic sheet to draw a portion of the sheet into the female mold cavity. Air is injected into the mold at two points; the first being through the top of the male mold thereby to expand the plastic sheet against the lower portion of the female mold and the second is through the upper portion of the female mold to force the sheet to conform tightly against thread forming contours which are provided on the male mold. The male mold is then withdrawn bringing the formed cap in the web with it and the mold is twisted out of the formed cap, leaving the formed cap in the web.

---

This invention pertains to a method for thermoforming a screw cap closure and more in particular to a method and apparatus to thermoform a screw cap closure using both a male and female mold and the introduction of an auxiliary molding force at two separate locations within the mold cavity.

Thermoformed screw cap closures, for example to seal plastic containers or jugs, are finding an ever increasing demand. Heretofore, such screw cap closures have been formed by a variety of processes utilizing a heated sheet of a thermoplastic material which is then placed in a female mold and placed under a vacuum to draw the heated sheet of plastic material into the mold or by using a male mold and drawing the heated sheet of thermoplastic material over the mold to form the desired screw cap closure shape. In addition, male mold forms have been used to punch the desired screw cap closure shape out of a heated sheet of thermoplastic material. While these methods have proven to be somewhat satisfactory in forming thermoformed screw cap closures, they have not resulted in the production of a thermoformed screw cap closure having close tolerances in the critical dimensions of the screw cap form and of the lid of the screw cap closure to provide a tight and effective seal between the screw cap closure and the opened mouth of the jug or bottle with which it is used.

Accordingly, it is an object of the present invention to provide a method for producing thermoformed screw cap closures within closely controlled tolerance ranges in order to provide an effective sealing closure for plastic bottles or jugs.

It is a further object of the present invention to provide a method for producing thermoformed screw cap closures of a high quality in a highly dependable and efficient manner.

A still further object of the present invention is to provide a method for producing thermoformed screw cap closures utilizing both a male and a female mold and the introduction of positive air pressure at two locations within the molds in order to closely control the critical dimensions of the screw cap closure.

These and other objects and advantages of the present invention will become more readily apparent with the consideration of the following specification in conjunction with the accompanying drawings.

Figure 1:
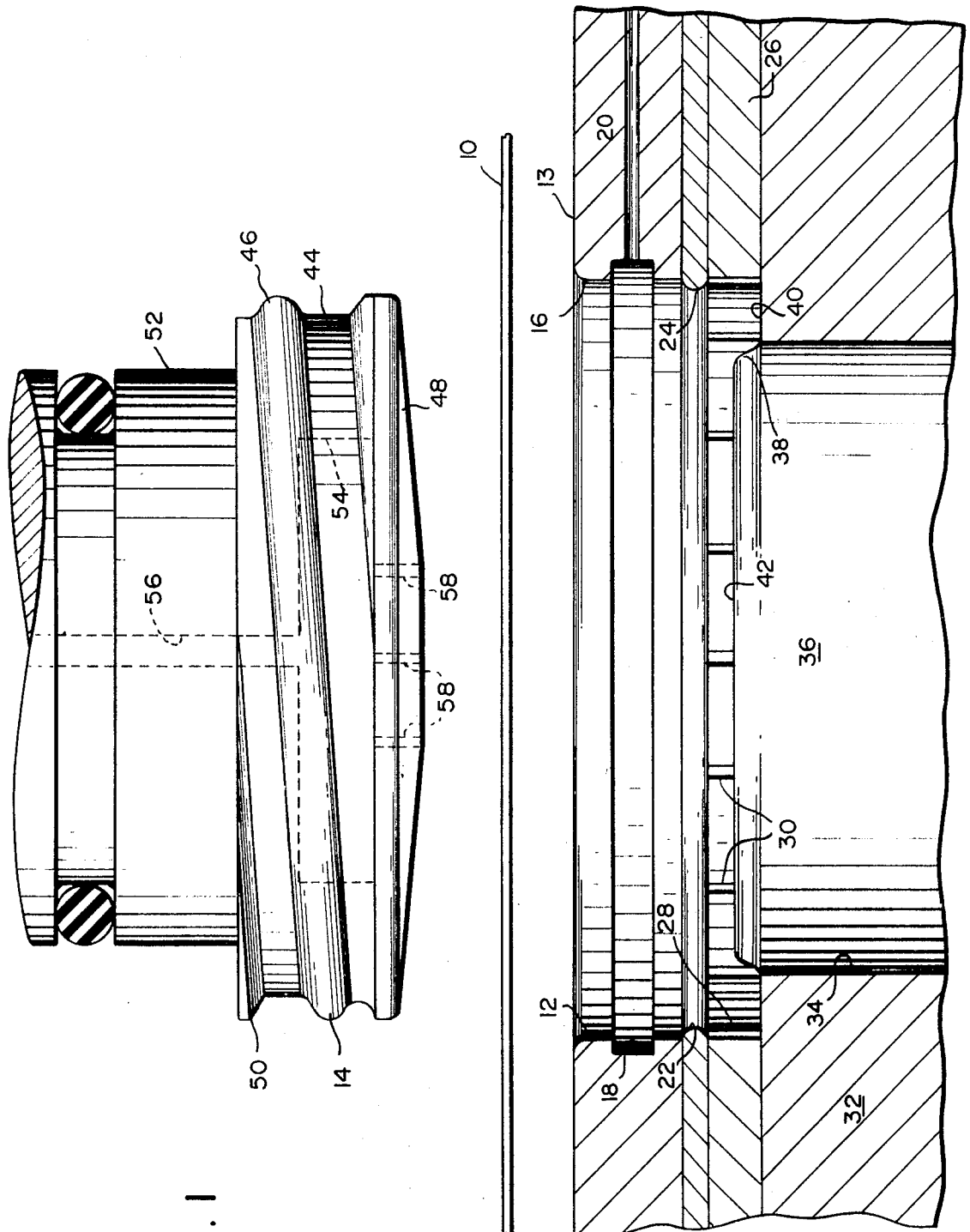
FIG. 1 is an elevational view, partly in section, showing one set of male and female molds positioned with respect to a heated sheet of thermoplastic material prior to the forming operation.

With reference now to FIG. 1, there is shown a sheet or web 10 of heated thermoplastic material which is placed between a female mold cavity 12 and a male mold form 14 prior to insertion of the male mold form 14 into the female cavity 12 to thermoform a screw cap closure. The female mold 12 is constructed from a number of separate elements for convenience in assembly; however, it is to be understood that the mold could be formed out of a solid piece of material if so desired.

Mold 12 includes a first side wall forming portion 13 having a cylindrical opening 16 therein with an undercut shoulder portion 18 which communicates with an air supply passage 20 through portion 13 connected to a source of air under pressure (not shown). Immediately adjacent the wall forming portion 13 in the female mold 12 is a ring member 22, which may be formed from any rigid metallic or plastic material having a rounded nodular portion 24 extending into the cylindrical opening of the female cavity 12. Brass has been found to be a desirable material for ring member 22 because it is relatively easy to machine and polish to a smooth finish. Adjacent the ring member 22 is a second wall forming member 26 which also has a cylindrical opening 28 therein having a slightly smaller diameter than the cylindrical opening 16 in wall forming portion 13. The internal wall surface of cylindrical opening in wall forming portion 26 includes a plurality of spaced indentations 30 provided around the periphery of the opening 28 for a purpose to be explained more fully hereinbelow.

The die cavity 12 is closed at its lower end by a block 32 having a cylindrical opening 34 therein through which is inserted a cylindrical plug member 36. Plug member 36 has a tapered end segment 38 and the plug 36 extends into the die cavity of female mold 12 beyond the edge portion 40 of the block 32 so that the lower portion of the mold 12 has a flat surface configuration formed by edge 40 of block 32 and a raised portion formed by the taper 38 of plug member 36 and another flat surface configuration formed by the flat top 42 of plug member 36. This portion of mold 12 defines the top of the cap closure configuration as will be explained more fully hereinbelow.

The male mold portion 14 comprises a substantially cylindrical portion 44 having protrusions 46 thereon in the general contour of, and spaced to form, a screw thread configuration. The male mold 14 is again made in two pieces, a dome-shaped lower portion 48 and the screw form cylindrical portion 50 having a cylindrical support shaft 52 connected thereto.

The cylindrical portion 50 also includes, adjacent the end which is joined to dome-shaped portion 48, a cylindrical cavity 54 which communicates with an axially disposed air supply passage 56 connected to a source of air under pressure (not shown). The dome-shaped portion 48 includes a plurality of air passages 58 through the lower surface of dome-shaped portion 48. Thus, when portion 48 and cylindrical portion 50 are assembled, as shown in FIGS. 1 and 2, air communication means are provided through axial bore 56, cavity 54 and passages 58 from the source of air under pressure to the exterior of the male mold 14.

Figure 2:
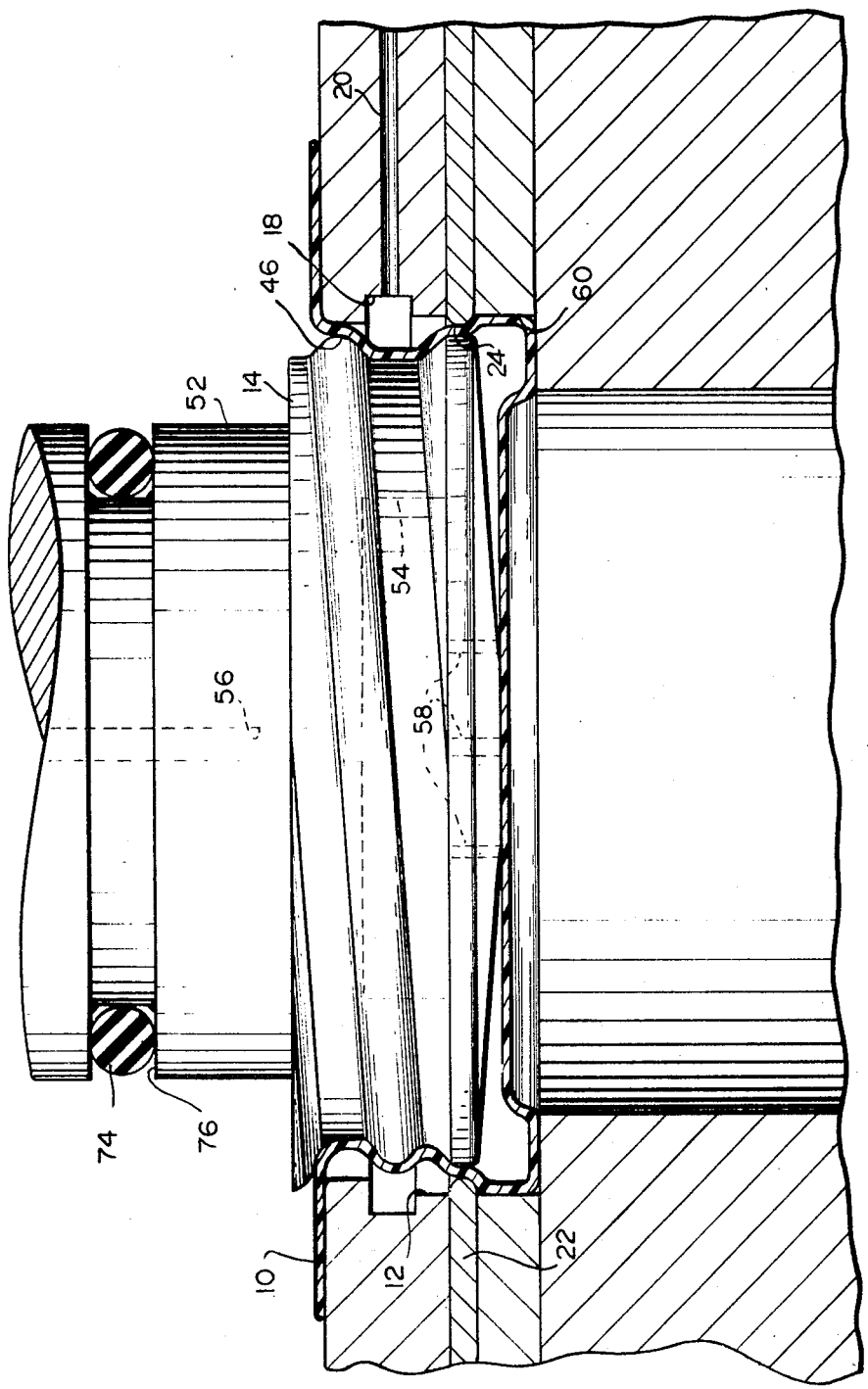
FIG. 2 is a view similar to FIG. 1 showing the position of the male and female molds and the thermoplastic sheet after the two molds have been brought together and air has been forced against the heated plastic sheet within the mold cavity.

With reference now to FIG. 2 as well, the thermoformed screw cap closure is formed by placing a flat sheet of heated thermoplastic material 10 between the male mold 14 and the female mold cavity 12 and then moving the male mold portion 14 into the female mold cavity 12 thus drawing a portion of the thermoplastic sheet material 10 into the cavity. As best seen in FIG. 2, once the male mold 14 has forced the thermoplastic sheet material into the female mold cavity 12, air under pressure is allowed to flow through air supply passages 20 and 56 in order to cause the heated plastic sheet material to conform to the configuration of the respective male and female molds. The greatest diameter of the male mold 14, for example at the maximum crest height of a screw form 46 and at the juncture 60 of the portions 48 and 50, is dimensioned to provide a clearance between the male mold form 14 and the wall of the female cavity 12 in excess of the thickness of the thermoplastic sheet 10. Hence, absent the pressure of an auxiliary molding force, such as air pressure, there would be insufficient cooperation between the mating of the two molds to form a precisely dimensioned screw cap closure.

As seen most clearly in FIG. 2, the ring member 22 with its nodular portion 24 extends radially inwardly within the female mold cavity 12 and is dimensioned so as to contact the sheet of thermoplastic material 10 and pinch the thermoplastic material between the male mold 14, for example in the area adjacent the juncture 60, and the nodular portion 24. This provides an effective air seal between the upper and lower portion of the female mold and serves to isolate the upper and lower portion of the mold. Hence, when air pressure is simultaneously introduced through air passages 20 and 56, there is an effective air seal between the upper and lower portions of the mold to segregate the air flow from air passage 20 and the air flow from air passage 56, respectively, to the upper and lower portions of the mold. Thus, the air flowing through air passage 20 flows circumferentially around the female mold cavity 12 within undercut shoulder portion 18 and forces the heated thermoplastic material against the thread forming contours on the male mold member 14. Simultaneously, the air flowing through air passage 56 passes through air holes 58 and causes the thermoplastic sheet material in the lower portion of the mold to expand away from the dome-shaped portion 48 of male mold 14. This segment of thermoplastic sheet material 10 expands away from the portion 48 of male mold 14 and conforms to the configuration of the lower portion of female mold 12. As the thermoplastic sheet material expands outwardly against the confinement of the female mold, discrete portions of the thermoplastic sheet material are forced into the spaced indentations 30 around the periphery of mold portion 28 to form circumferentially spaced protrusions in the formed screw cap closure.

Figure 3:
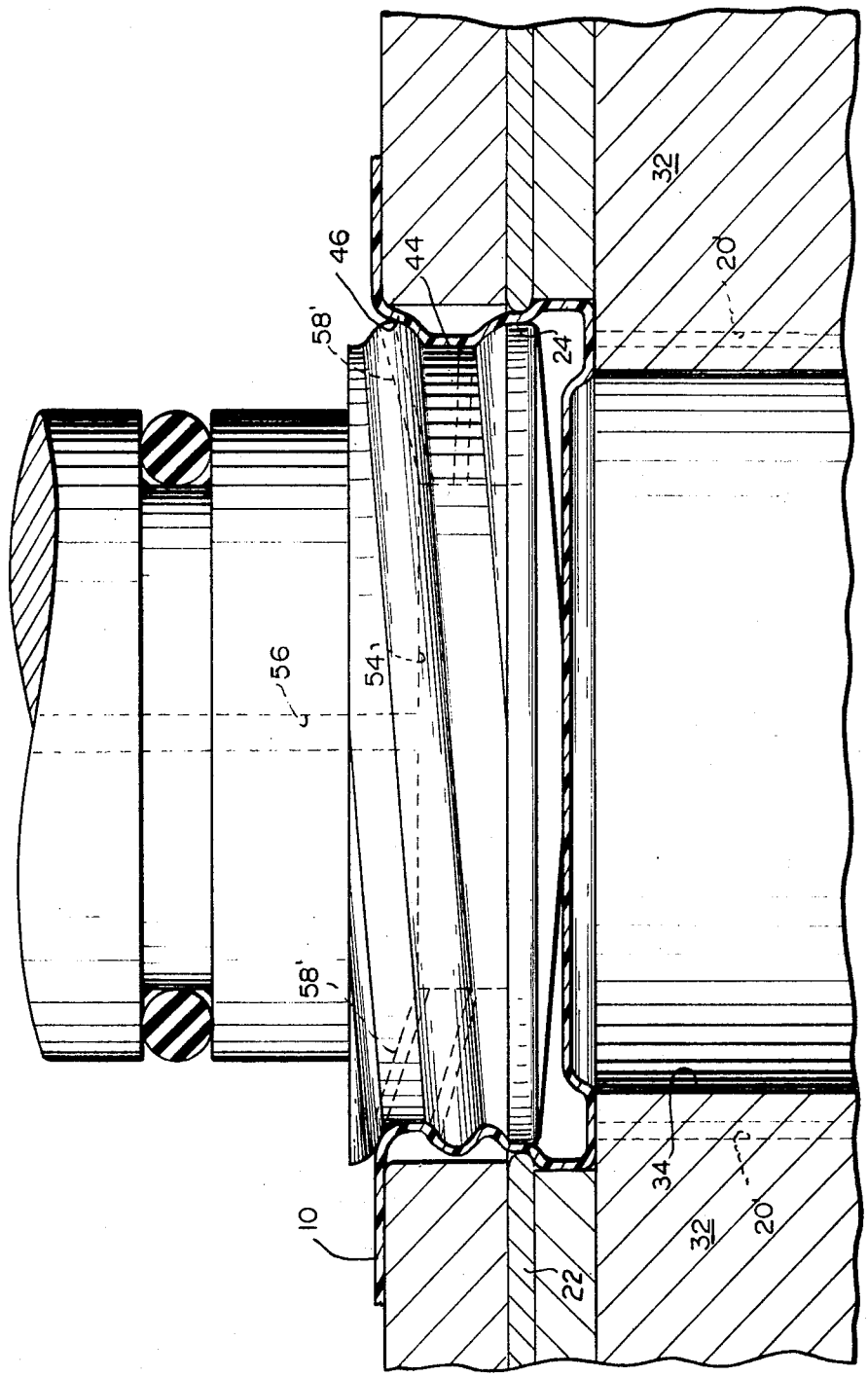
FIG. 3 is a view similar to FIG. 2 showing an alternate embodiment.

While the method of the present invention has been described as utilizing positive air pressure through air passages 20 and 56, it is to be understood that vacuum pressure or a combination of positive and vacuum pressure could also be used. With reference to FIG. 3, the male mold 14 is shown having the air passage 56 and cavity 54 as in the embodiment of FIG. 2 but the plurality of air passages 58' radiate radially outwardly from cylindrical cavity 54. Thus, when a vacuum is applied across air passage 56, the thermoplastic material 10 will be sucked against the thread forming protrusions 46 on cylindrical portion 44. Air passages are also provided in the closed lower end of die cavity 12, for example passages 20' spaced circumferentially about cylindrical opening 34, so that when a vacuum is applied across air passages 20', the thermoplastic material is sucked against the lower end of die cavity 12.

Additionally, both positive and vacuum pressure through either the male mold form or the female die cavity may also be employed to achieve the same result, if so desired.

Figure 4:
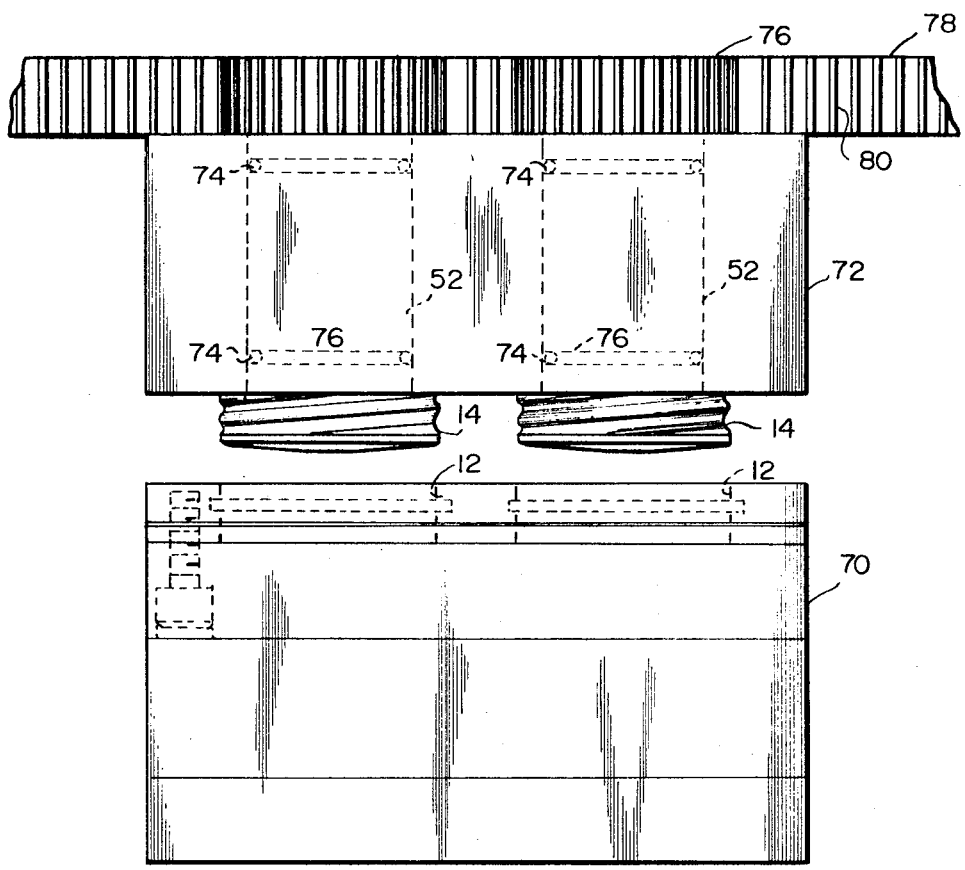
FIG. 4 is an elevational view showing a portion of the male and female mold assembly including the rotative means to rotate the formed screw cap closures off the male mold.

With reference now to FIG. 4, once the screw cap closure has been formed by moving the male mold with a thermoplastic sheet of heated material into the female mold cavity and the thermoplastic material left to set and cool, the male mold is retracted with respect to the female mold cavity drawing the formed screw cap closure in the web 10 with it. Simultaneously, the male mold is rotated about its central axis to allow the male mold to disengage from the screw cap closure. As seen in FIG. 3, a plurality of female molds 12 are positioned in a stationary mounting block 70 and a plurality of male molds 14 are rotatably mounted within a moving mounting block 72 which is adapted to move vertically with respect to stationary block 70 to allow the male mold to move into the female mold cavity 12. Supporting shaft 52 for each male mold is rotatably journaled within the moving block 72 and is provided with appropriate sealing means such as O-ring seals 74 within a groove 76 cut into the circumference of shaft 52. As explained above, the male mold 14 is secured to one end of shaft 52 and, at the other end, shaft 52 is provided with a gear 76 fixed thereto. Block 72 is also provided with a rack 78 having teeth 80 thereon which engage and mesh with the teeth on gear 76 and rack 78 is adapted to be moved transversely of gears 76 thereby to cause rotation of the gears. Rotation of the gears thus causes rotation of shaft 52 and male mold 14 secured thereon. Hence, when moving block 72 is retracted with respect to fixed block 70, rack 78 is moved with respect to moving block 72 to simultaneously cause rotation of male member 14 to allow the male mold to unscrew from the formed screw cap closure. After the screw cap closures have been formed in the web 10 and the molds have been separated, the web is transferred out from between the male and female molds and the formed screw cap closures are separated from web 10 by a trimming operation.

Figure 5:
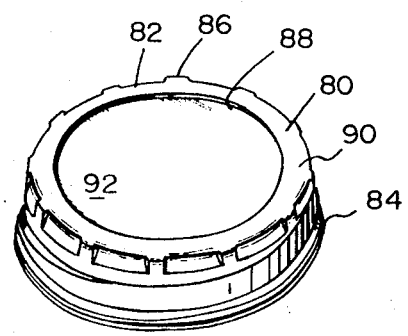
FIG. 5 is a perspective view of the completed screw cap closure formed by the method and apparatus of the present invention.

Reference is now made to FIG. 5 which shows a screw cap closure completed according to the method and apparatus of the present invention. The screw cap closure 80 has a substantially planar top portion 82 and a depending skirt portion 84 with the depending skirt portion 84 being provided with a screw formed configuration formed by the screw form configuration 46 on the male mold 14. Around the periphery of the juncture between the substantially planar top 82 and depending skirt 84 are provided a plurality of protrusions 86 which were formed by that portion of the thermoplastic material which flowed into protrusions 30 in the female mold cavity. The planar top 82 is also formed with a circumferential annular groove 88 so that a peripheral portion 90 of the top is at a slightly higher elevation than the central portion 92 due to adherence of the top during formation to the cylindrical plug member 36 in the female die cavity 12. Reference is made to applicant's copending application filed on even date herewith (and identified by CMS File No. 24766), which application is incorporated herein by reference, for a more detailed and fuller explanation of the construction, features and advantages of the screw cap closure 80 formed by the method and apparatus of the present invention.

It is thus seen that by the method and apparatus of the present invention a thermoformed screw cap closure is formed which has superior sealing properties due to the precise control of the critical dimensions of the cap during the thermoforming process.

What is claimed is:

1. A method for thermoforming a screw cap closure comprising:
   heating a sheet of thermoplastic material;
   placing said heated sheet of thermoplastic material between separated male and female mold forms;
   moving at least one of said male and female mold forms relative to the other to telescopically engage said mold forms thereby drawing a portion of said heated thermoplastic material into said female mold form;
   said male and female mold forms being provided with air passage means communicating with a source of pressurized air;
   providing air under pressure to selected portions of each of said male and female mold forms to cause said heated thermoplastic material to conform to the configuration of the male and female mold forms in order to closely control the dimensions of said thermoformed screw cap closure; and
   sealing said heated thermoplastic material while said mold forms are telescopically engaged to provide an air seal between the air passage means in said male mold form and air passage means in said female mold form thereby to form at least two separate chambers within said telescoped mold forms.

2. The method as defined in claim 1 including providing said male mold form with screw thread forming protrusions thereon and wherein said air passage means in said female mold form is located adjacent the screw thread forming protrusions on said male mold form whereby when air is introduced through said air passage means in said female mold form said thermoplastic material is forced to closely conform to the screw thread forming protrusions on said male mold form.

3. The method as defined in claim 1 including the step of moving at least one of said male and female mold forms out of telescopic engagement after said screw cap closure has been formed and simultaneously rotating said male mold form about its longitudinal axis to free said completed screw cap closure from engagement with said male mold form.

4. A method for thermoforming a screw cap closure comprising:
   heating a sheet of thermoplastic material;
   placing said heated sheet of thermoplastic material between separated male and female mold forms;
   moving at least one of said male and female mold forms relative to the other to telescopically engage said mold forms thereby drawing a portion of said heated thermoplastic material into said female mold form;
   said male and female mold forms being provided with air passage means communicating with means to impress a vacuum across said air passage means;
   providing a vacuum across selected portions of said male and female mold forms to cause said heated thermoplastic material to conform to the configuration of the male and female mold forms in order to closely control the dimensions of said thermoformed screw cap closure; and
   sealing said heated thermoplastic material while said mold forms are telescopically engaged to provide an air seal between the air passage means in said male mold form and air passage means in said female mold form thereby to form at least two separate chambers within said telescoped mold forms.

5. The method as defined in claim 4 including providing said male mold form with screw thread forming protrusions thereon and wherein said air passage means in said male mold form are located adjacent the screw thread forming protrusions on said male mold form whereby when a vacuum is impressed across said air passage in said male mold form said thermoplastic material is forced to closely conform to the screw thread forming protrusions on said male mold form.

6. The method as defined in claim 4 including the step of moving at least one of said male and female mold forms out of telescopic engagement after said screw cap closure has been formed and simultaneously rotating said male mold form about its longitudinal axis to free said completed screw cap closure from engagement with said male mold form.

References Cited

UNITED STATES PATENTS

| | | | |
|---|---|---|---|
| 3,337,664 | 8/1967 | Lyon | 264—89 |
| 3,338,997 | 8/1967 | Tigner | 264—296 X |
| 3,444,282 | 5/1969 | Burkett | 264—92 X |
| 2,799,049 | 7/1957 | Wilson | 18—2 RS X |
| 3,102,304 | 9/1963 | Divers | 18—2 RS X |
| 3,290,418 | 12/1966 | Best | 264—92 |
| 3,507,942 | 4/1970 | Lynch | 264—94 X |

ROBERT F. WHITE, Primary Examiner

J. H. SILBAUGH, Assistant Examiner

U.S. Cl. X.R.

18—2 RS, 5 BV, 19 F; 249—59; 264—92, 94, 334